No. 87,037.
PATENTED FEB. 16, 1869.
J. C. FULLER.
PLANT SETTING DEVICE.
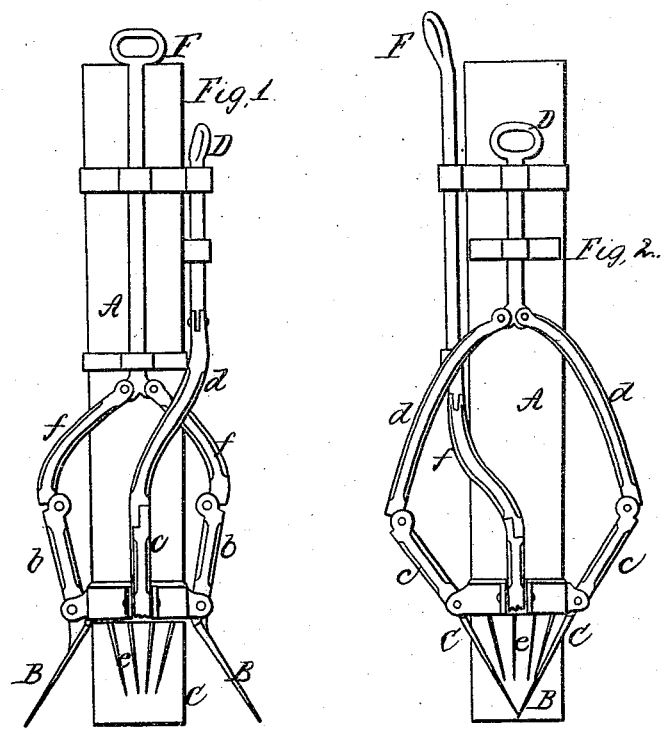
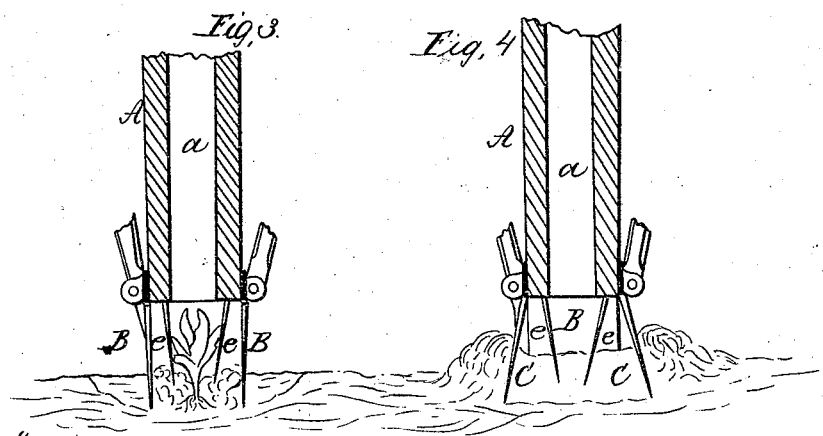

JOHN C. FULLER, OF PHŒNIX, NEW YORK.

Letters Patent No. 87,037, dated February 16, 1869.

IMPROVEMENT IN PLANT-SETTING DEVICE.

The Schedule referred to in these Letters Patent and making part of the same.

*To all whom it may concern:*

Be it known that I, JOHN C. FULLER, of Phœnix, in the county of Oswego, and State of New York, have invented a new and improved Plant-Setting Device, or implement; and I do hereby declare that the following is a full, clear, and exact description thereof, which will enable those skilled in the art to make and use the same, reference being had to the accompanying drawings, forming part of this specification, in which—

Figure 1 shows a front view of my invention, with the front shovel removed, and

Figure 2 shows a side view, with one shovel also removed.

Figures 3 and 4 are detail views.

Similar letters of reference indicate like parts in all the figures.

This invention consists in a dropping-tube, having two pairs of small scrapers, or shovels, hinged to its lower end, one pair of shovels being for opening the ground, and the other pair for closing the dirt around the plant after it has been dropped through the tube, the shovels being coupled to common handles, in such manner that the two ground-opening shovels are operated by a single handle, and the two closing-shovels operated by a second handle, as hereinafter more fully explained.

In the accompanying drawings—

A is the dropping-tube, to the lower end of which are hinged two pairs of shovels, B B, C C, the two shovels B B being hinged or pivoted to opposite sides of the tube, and the shovels C C being hinged opposite to each other also.

Both shovels B B connect with a vertically-sliding hand-rod, F, by means of arms $b$ $b$, and links $f f$, and the shovels C C, in like manner, connect with a hand-rod, D, by means of rods $c$ $c$, and links $d d$.

The lower end of the tube is provided with a series of slight fingers, $e$, which are arranged around the lower mouth of the tube in a circular manner.

Its operation is as follows:

The shovels C C are brought into a closed position, as shown in fig. 2, while the shovels B B are left extended, as seen in fig. 1, and the implement is then inserted into the ground to the desired depth.

The operator now elevates the handle D, and this throws out the shovels C C, as shown in fig. 4, and forms a hole in the ground for receiving the plant.

The plant is next placed in the upper end of the tube, in an upright position, and falling through the bore $a$ of the tube, it is received and steadied in its upright position, below the tube, by the fingers $e$, as shown in fig. 3.

The handle F now being thrown up, the shovels B B are drawn together, and close the dirt around the plant, as seen in fig. 3, and the operation of setting a plant is completed.

By these means the operation is conducted with greater expedition and facility than by the ordinary methods.

Having thus described my invention,

What I claim as new, and desire to secure by Letters Patent, is—

The tube A, ground-opening devices C C, $c$, $d$, D, closing-devices B B, $b$, $f$, F, and fingers $e$, constructed and operated as herein shown, and for the purpose specified.

JOHN C. FULLER.

Witnesses:
J. C. HUTCHINSON,
E. DINGMAN.